(12) United States Patent
Arbore

(10) Patent No.: US 6,783,007 B2
(45) Date of Patent: Aug. 31, 2004

(54) ARM ASSEMBLY FOR CEMENT TRUCK NOZZLE CLEANER

(76) Inventor: Cataldo S. Arbore, 371 Carlsam Dr., Rochester, NY (US) 14609

( * ) Notice: Subject to any disclaimer, the term of this patent is extended or adjusted under 35 U.S.C. 154(b) by 0 days.

(21) Appl. No.: 10/095,378

(22) Filed: Mar. 12, 2002

(65) Prior Publication Data

US 2002/0117427 A1 Aug. 29, 2002

Related U.S. Application Data

(63) Continuation-in-part of application No. 09/401,229, filed on Sep. 22, 1999, now Pat. No. 6,354,439.

(51) Int. Cl.$^7$ ................................................ B07B 1/49
(52) U.S. Cl. ....................... 209/421; 209/420; 209/931
(58) Field of Search .................. 209/420, 421, 209/355, 353, 352, 235, 242, 241, 240

(56) References Cited

U.S. PATENT DOCUMENTS

| | | |
|---|---|---|
| 3,596,759 A | 8/1971 | King et al. |
| 3,886,063 A | 5/1975 | Friesz |
| 3,997,434 A | 12/1976 | Macauley, Jr. |
| 4,016,978 A * | 4/1977 | Danna, Jr. ................. 209/2 |
| 4,127,478 A | 11/1978 | Miller |
| 4,192,745 A | 3/1980 | Hood |
| 4,285,808 A | 8/1981 | Horton |
| 4,792,234 A | 12/1988 | Doherty |
| 4,963,031 A | 10/1990 | Brown |
| 5,127,740 A | 7/1992 | DeBoer |
| 5,466,092 A | 11/1995 | Semenza et al. |
| 6,155,277 A * | 12/2000 | Barry ....................... 134/104.4 |

* cited by examiner

Primary Examiner—Donald P. Walsh
Assistant Examiner—Jonathan R Miller
(74) Attorney, Agent, or Firm—Brian B. Shaw, Esq.; Stephen B. Salai, Esq.; Harter, Secrest & Emery LLP

(57) ABSTRACT

A device enabling the timely removal and subsequent recycling of residues remaining in a pouring chute through which the load of a cement from a mixing drum of a mobile delivery vehicle was discharged. A strainer on a movable arm attached to the vehicle is placed under the chute to receive an effluent which results from spraying the inside of the nozzle with water. Solid particulates are retained by the strainer and a slurry which emerges from the strainer is pumped into the mixing drum, allowing the separated materials to be recycled when the vehicle returns to its base.

12 Claims, 5 Drawing Sheets

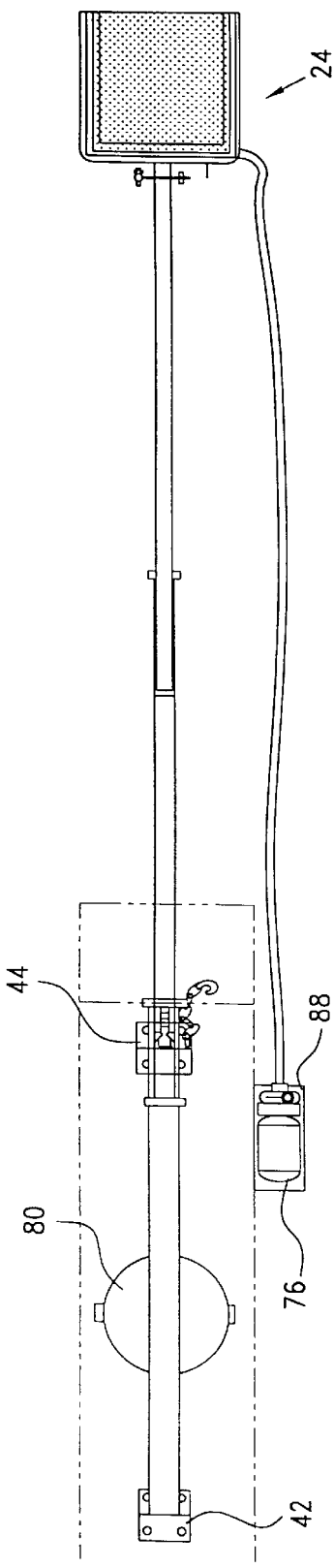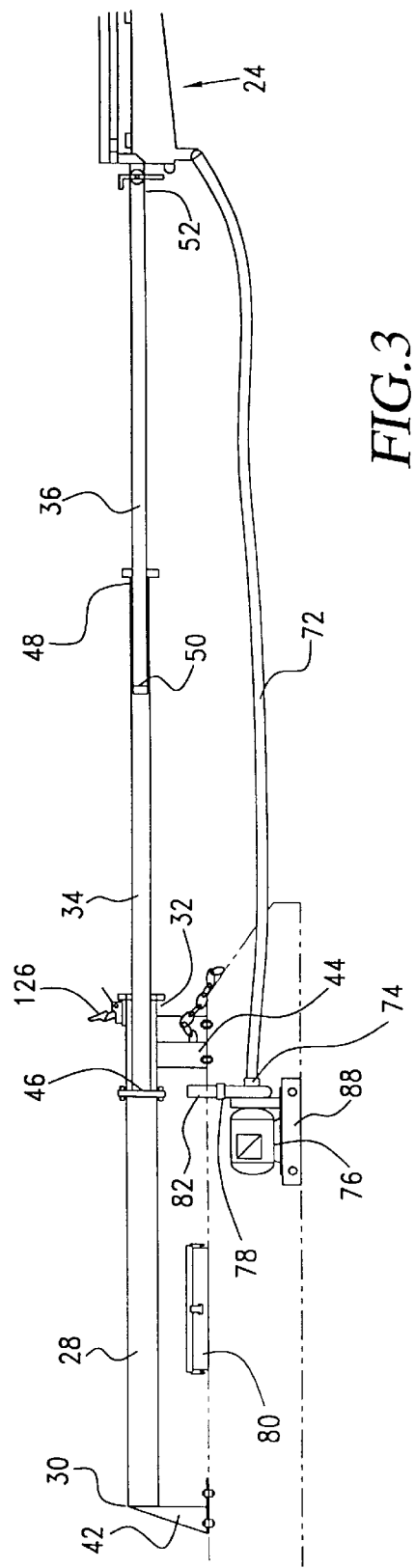

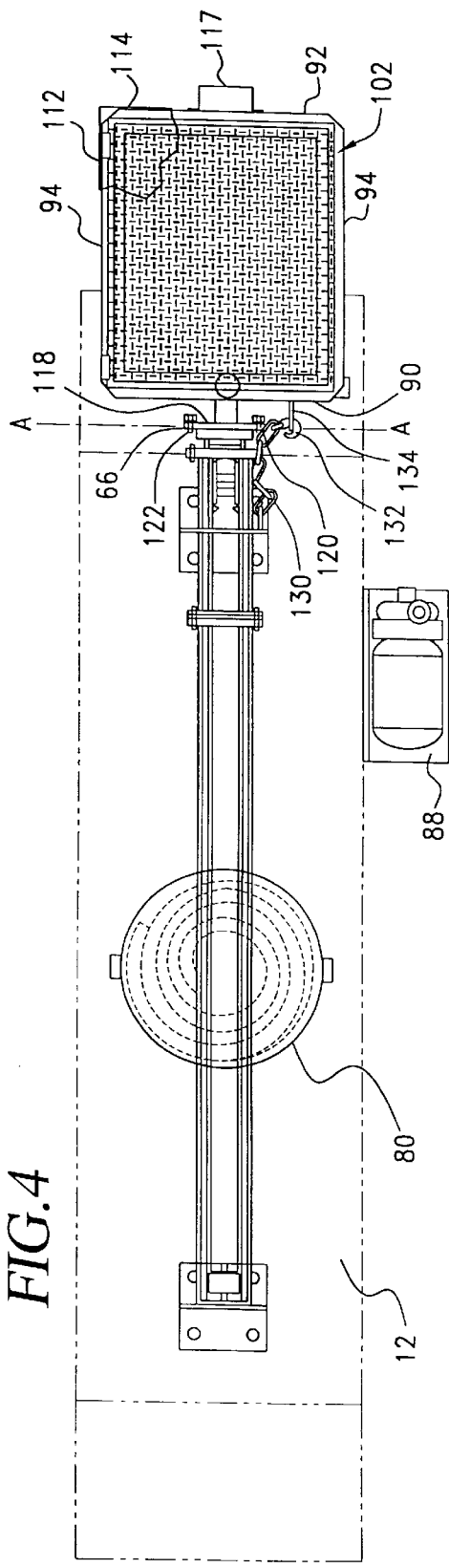
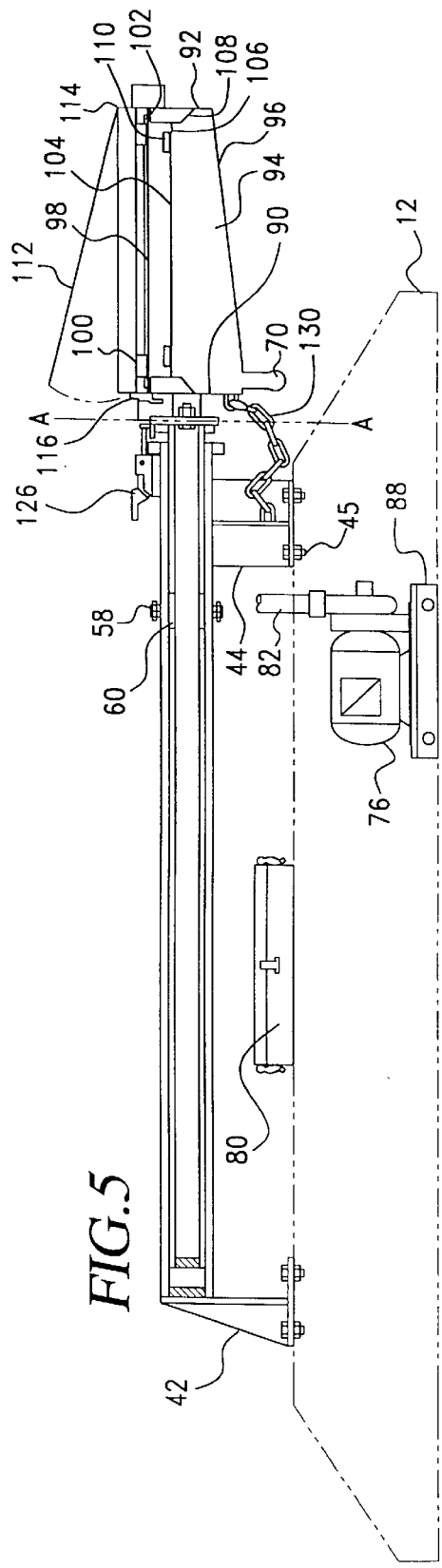
FIG.4
FIG.5

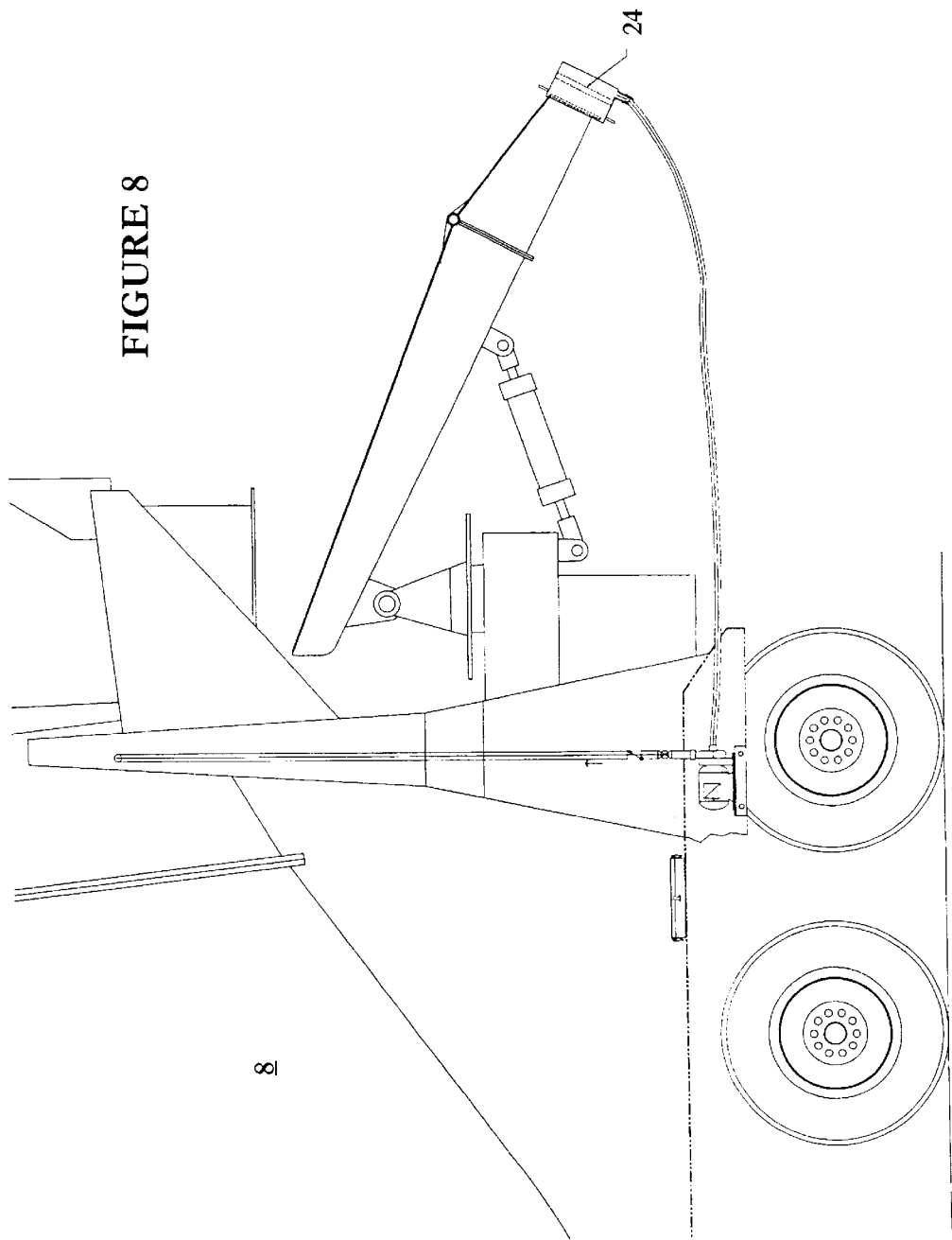

ARM ASSEMBLY FOR CEMENT TRUCK NOZZLE CLEANER

The present application is a continuation in part of U.S. Ser. No. 09/401,229 filed Sep. 22, 1999, now U.S. Pat. No. 6,354,439, which disclosure is hereby expressly incorporated by reference.

FIELD OF THE INVENTION

The present invention relates to a system for the timely flushing and recovery of residues from a pouring chute on a cement truck in order to prevent then from hardening in the chute and more particularly to a self-contained system that is transportable with the truck.

BACKGROUND OF THE INVENTION

Cement and concrete mixes are frequently delivered by a so-called "transit mixer". The transit mixer is a truck with a rotatable mixing drum, into which batch ingredients are loaded. The raw materials are mixed by rotating the drum as the truck proceeds to its intended destination, where the cement is poured as required. This procedure is well known in prior art.

A major issue in the construction industries is how best to clean and recycle residual materials out of the system. Residues, if not removed from the truck soon enough, harden and present the operator with an enormous cleaning problem. Also it is to the operator's advantage to handle residues in an environmentally benign manner, since this avoids both legal sanctions and the wastage of materials which have an economic value. The issues of removing and recycling residual material are the subject of prior art, as exemplified by U.S. Pat. Nos. 3,596,759, 3,886,063, 3,997,434, 4,016,978, 4,127,478, 4,285,808 and 5,127,740. Washing and material reclamation systems are described in U.S. Pat. Nos. 3,997,434 and 4,285,808; however, these deal with systems wherein the residues are washed directly out of the transit mixer into stationary handling equipment located at some base of operations. U.S. Pat. No. 5,127,740 describes a system wherein a chemical retardant is added to excess mixture to delay its hardening, and a chemical accelerant is subsequently added to restore the original hardening characteristics of the mixture when it is once again needed for use. U.S. Pat. No. 4,016,978 describes a mobile cleaning and separating system which is appended to the truck, and is intended to deal with excess material remaining in the mixing drum.

Normally the mixing drum is cleaned out after returning to its base, but the pouring chute, which directs the transfer of material from the mixing drum to its intended point of discharge, must be cleaned immediately after each use. The residue in the pouring nozzle has a high surface area relative to its volume, and therefore dries very rapidly. This inevitably accelerates its hardening. Currently available alternatives include flushing out the nozzle with water and allowing the products of flushing to be dumped at the site, which is environmentally undesirable, or collecting them in an improvised container.

SUMMARY OF THE INVENTION

It is the primary purpose of the present invention to provide a convenient portable system to allow the operator to flush out the pouring nozzle with water so that the washed out solids are retained in a strainer and the resulting slurry is directed into the mixer drum. The system is affixed to the truck and constructed so that the strainer can be retracted and stowed close against the truck when not in its operative position. When the truck returns to its depot, the drum is cleaned in the normal way at a cleaning station, and the contents of the strainer are merged with like residues from other sources to be recycled.

BRIEF DESCRIPTION OF THE DRAWINGS

FIG. 2 is a top plan view of the invention in its extended mode.

FIG. 3 is a side elevational view of the invention in its extended mode.

FIG. 4 is an enlarged top plan view of the invention in a retracted mode.

FIG. 5 is a side elevational view of the invention in a retracted mode.

FIG. 8 is a side elevation view showing the strainer releasably connected to the chute.

DETAILED DESCRIPTION OF THE PREFERRED EMBODIMENTS

Even though the words "cement" and "concrete" are not strictly synonymous, for the purposes of this invention, the term "cement" will be understood as referring to either. The term cement includes these combinations of materials that when mixed with sufficient water will set.

Figure 1:
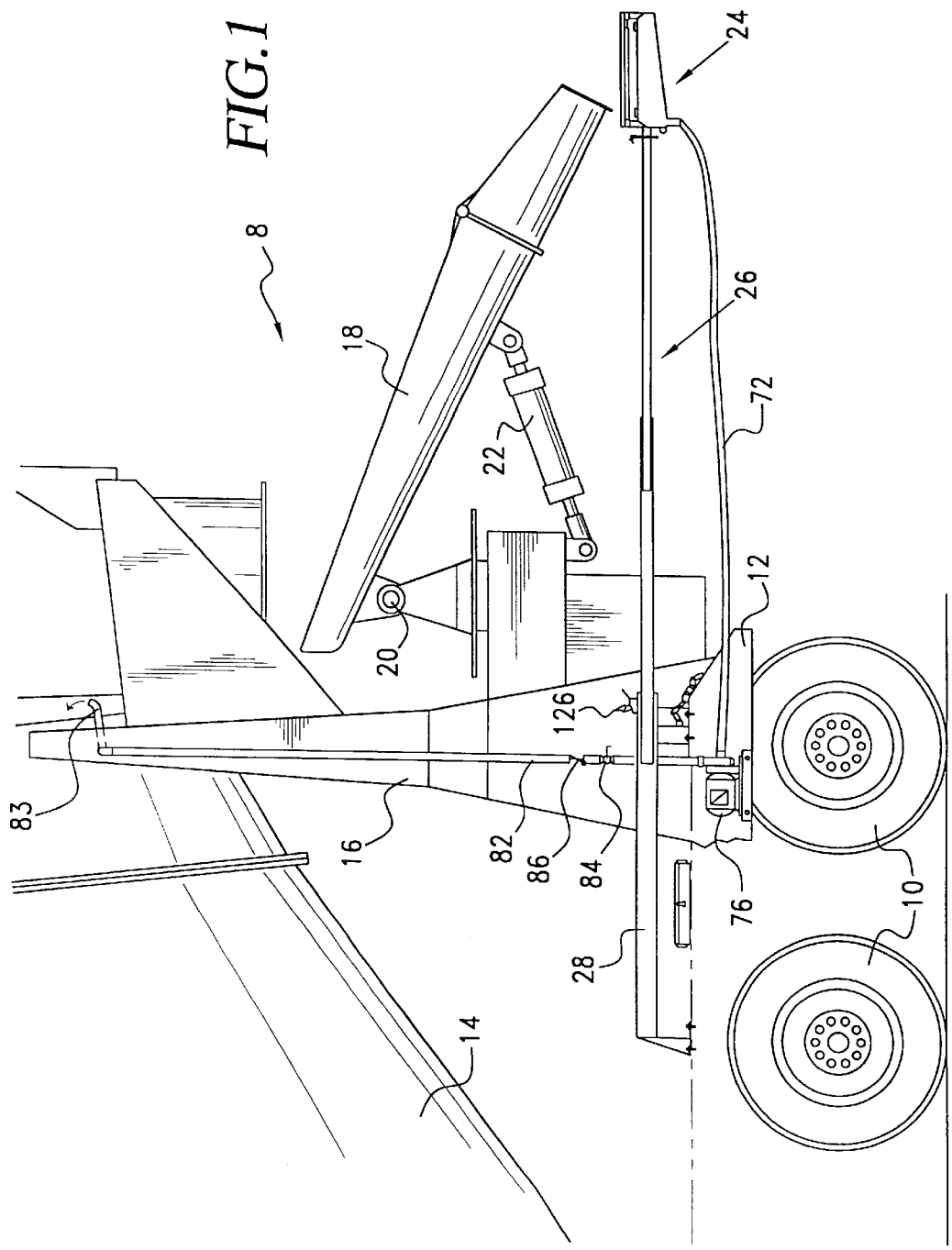
FIG. 1 is a side elevational view of a rear portion of a cement truck and the invention mounted thereon in an extended operative mode.

FIG. 1 is side view of the rear of a cement truck 8, showing rear wheels 10, a wheel guard 12, a mixing drum 14, a support member 16 and a cement pouring chute 18. The cement-pouring chute is supported at a pivoted mount 20 and is operated by a pneumatic or hydraulic cylinder 22. It is not necessary to specify further components of the truck and mixer, except as they may become relevant to describing the invention.

The invention comprises a strainer 24 mounted to the end of a telescopic arm 26, which has an extended position as shown in FIGS. 1–3 and a retracted position as shown in FIGS. 4 and 5. The arm comprises stationary member 28 with a front end 30 and a back end 32, an outer sliding member 34 which fits inside the stationary member 28, and an inner sliding member 36 which fits inside the outer sliding member 34. Preferably, the cross-sectional profiles of the sections permit telescoping of the sections. In one configuration, each member of the arm 26 has a square cross-section. The stationary member 28 is fixedly mounted at its front end 30 onto a first bracket 42 and some way in from its back end 32 onto a second bracket 44, both the brackets being affixed with bolts such as 45 to the top of the wheel guard 12.

Figure 6:
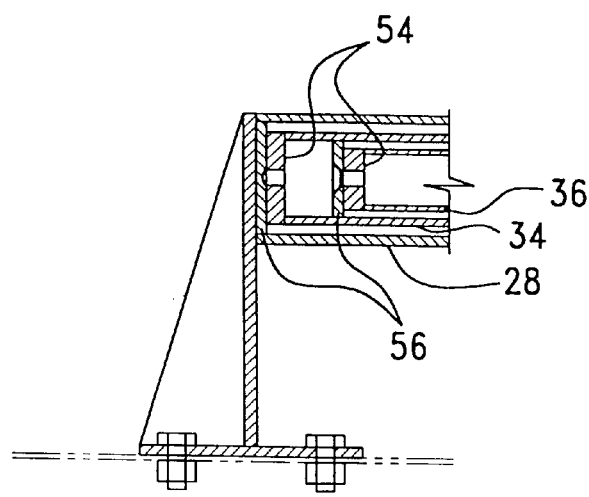
FIG. 6 is a cross-sectional view of the telescopic arm.

The outer sliding member 34 has an inner end 46 and an outer end 48. Similarly, the inner sliding member 36 has an inner end 50 and an outer end 52. As best shown in FIG. 6, each inner end 46 and 50 has a flat closure 54 which has an attachment point in the form of a threaded hole at its geometric center. To this attachment point is bolted a slide flange 56 whose perimeter conforms in size and shape to the inner dimensions of the next outer telescopic member, such that there is just sufficient clearance to provide for movement. The slide flange 56 is fabricated from a durable material providing low sliding friction with the surface it contacts, and is preferably fabricated from Teflon. To prevent the outer sliding member 34 from being pulled out too far out of the stationary member 28, the stationary member has a stop 58 located about one-quarter of its length from the back end 32. The outer sliding member 34 has an internal stop 60 for the inner sliding member 36. Both stops prevent the passage of the slide flanges 56.

Figure 7:
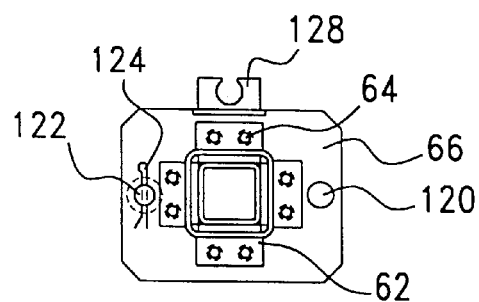
FIG. 7 is an end elevational view along plane AA in FIGS. 4 and 5.

At the outer end 52 of the inner sliding member 36 are four orthogonal isoplanar lugs such as 62, shown in a front view in FIG. 7, each lug having two holes for bolts such as 64. A first connecting plate 66, having holes which match those of the lugs, is affixed to the lugs with bolts 64, in a vertical plane and orthogonal to the centerline of the telescopic arm 26. In addition, the first connecting plate 66 has two symmetrically disposed fastening holes spaced horizontally apart so as to avoid possible interference with bolts 64.

The strainer 24 has an outlet port 70, to which is attached one end of a flexible hose 72. The other end of the hose is connected to an inlet 74 of a pump 76, the pump also having an outlet opening 78. Both ends of the hose are equipped with quick disconnect attachments which allow the hose to be removed and kept in a storage bin 80 when not in use. The outlet 78 of the pump is connected to the inlet end of a pipe 82 having also an outlet end, the pipe being rigidly affixed to the support member 16. At the outlet end of the pipe is a hose 83 directable into the mixing drum 14. Immediately downstream from the pump outlet 78, the pipe has a shutoff valve 84 and, slightly further downstream, a check valve 86. The pump 76 is mounted with a right-angled bracket 88 to the side of the wheel guard 12.

Referring again to FIG. 5, the strainer 24, includes metal housing, rectangular or square in plan, having a front-facing wall 90, a rear-facing wall 92, two side-facing walls 94 and a bottom 96. The bottom 96 slopes downward towards the front 90. Near the lowest edge of the bottom is affixed the aforementioned outlet 70. Enclosed by the sides of the strainer, orthogonal to all of them and slightly below their uppermost edges is a first screen 98, comprising a metal mesh bounded by strengthening members. The first screen is a relatively coarse primary screen and has an opened and a closed position, and is fastened to a side-facing wall 94 of the strainer with hinges 100. It is supported flat in its closed position by a flange 102 which is affixed along the entire inside perimeter of the strainer walls. When viewed from the top, the first screen has dimensions slightly smaller than the inside dimensions of the strainer, which allow its easy movement between the open and closed position.

Some distance below the first screen, but well above the lowest edge of the rear-facing wall 92, is a second relatively fine, secondary screen 104 which is constructed similarly to the first screen 98 but has a finer mesh. When viewed from above, it has smaller dimensions than the first screen, and is supported in like manner by an inner flange 106. This flange is affixed to the entire inside perimeter of the strainer through an intermediate spacer 108. The second screen also has an opened and a closed position, and is fastened to the spacer with hinges 110. The first and second screens are oriented alike with respect to their hinged edges. The dimensions of the second screen and those of the spacer are such as to allow the easy movement of said second screen between its open and closed positions. The clearance between the two screens allows both of them to be simultaneously maintained in their open positions.

Preferably, the volume of the housing below the secondary screen is sufficient to provide fluid flow through the screen. That is, the volume of the housing below the secondary screen is selected to ensure a liquid level in the housing below the secondary screen upon a flow rate of cleansing liquid and entrained residue from the nozzle 18.

The strainer 24 also comprises a cover 112, which is attached to the top edge of the rear-facing wall 92 with a piano type hinge 114 and can be kept closed with a clasp mechanism 116. The strainer further comprises a hand grip 117 affixed to the exterior of the rear-facing wall 92.

A second connecting plate 118 is rigidly attached to the front-facing wall 90 of the strainer, with some clearance between them, such that the planes of plate and the front-facing wall are parallel. The second connecting plate 118 matches the first connecting plate 66 in dimensions and also has fastening holes which match and align with those on the first connecting plate 66. The connecting plates are joined together with a pivot-bolt 120 through one pair of aligned fastening holes and with a removable stud 122 through the other aligned fastening holes. The stud 122 is held in place by a cotter pin 124 unless its removal is desired. Removal of the stud 122 allows the strainer 24 to pivot sideways, so that with the cover 112 opened both screens 98 and 104 may hinge open. The pivot-bolt 120 is located such that when the strainer 24 tilts, the screens 98 and 104 have their hinges 100 and 110 along their respective upper edges.

The telescopic arm 26 is in its transport position when retracted, and in its operable position when extended. In its transport position, the arm is immobilized by securing the inner sliding member 36 to the stationary member 28 with a safety latch 126 which engages with an opening in a catch 128. The system is additionally secured by a short safety chain 130, one end of which is permanently attached to the second bracket 44 and the other of which is removably fastened to the outside of the strainer with a hook 132 and an eye bracket 134.

Operation of the system begins with the operator unhooking the safety chain 130 and unfastening the safety latch 126. The telescopic arm is now free to move and the strainer is pulled manually to its operable position beneath the pouring nozzle 18. The flexible hose 72 is connected to the strainer outlet 70 and the pump inlet 74. The strainer cover 112 is opened and water flushed from a hose into the pouring nozzle 18, the water originating either from a storage reservoir on the vehicle 8 or from an external source. The water entrains any solid particles adhering to the nozzle to form an effluent which flows down into the strainer. The first screen 98 retains the fraction comprising the largest particles and passes the remainder of the effluent. The second screen 104, being of finer mesh, retains a further fraction of particles and passes the remaining effluent which comprises a slurry of the smallest particles in water. This effluent collects in the lowest part of the strainer 24 and flows into the flexible hose 72. The shutoff valve 84 is opened and the pump activated. The slurry flows out of the strainer and through the flexible hose, the pump and the pipe 82, from the outlet end of which it is directed through the hose 83 into the mixing drum 14. When the pump is shut off, residual slurry in the tube is prevented by the check valve 86 from draining back into lower parts of the system.

Once the filtration is complete, the strainer cover 112 is closed, the flexible hose 72 disconnected and returned to the storage bin 80, and the telescopic arm 26 returned to its retracted position where it is secured. If no further cement remains to be delivered at another site, the cement truck 8 is driven to a cleaning station at its home base.

When the truck returns to its cleaning station, the telescopic arm 26 is released from its transport position and extended until the strainer is directly above a prescribed collecting point. The strainer cover 112 is opened, the cotter pin 124 is removed to permit removal of the stud 122, and the strainer 24 tilts about the pivot-bolt 120. The tilt is manually increased beyond 90°, allowing the screens 98 and 104 to swing freely about the hinges 100 and 110 which are along the uppermost edges of the respective screens. The retained solids drop into the collection area, where they merge for recycling with like material from other vehicles. Any remaining residues are sprayed off and the strainer and telescopic arm returned to their transport position until the next use.

The slurry that was delivered into the mixing drum 14, having merged with residues already contained therein, is treated as part of those residues in the customary manner.

The use of two screens in preference to a single screen assists the filtration process. If a single fine-mesh screen were used it would tend to clog and slow the drainage of the fraction passing through it. On the other hand, a single coarse-mesh screen would allow the passage of larger particles which could cause blockages downstream and also damage the pump.

The present invention comprises an assembly which is a combination of specially fabricated constituents and standard items. Bearing in mind the corrosive conditions under which the strainer would operate, a preferred embodiment of the invention would comprise a strainer fabricated from type 316 stainless steel. The preferred embodiment of the invention would also comprise a telescopic arm fabricated from tube steel.

It is also contemplated that the strainer may be removably connected to the chute to intersect the flow path of effluent from the chute. For example, the strainer may be hooked or releasably fastened to the chute such that material passes through the strainer and the strainer retains the entrained material. Upon completion of the cleaning of the chute, the strainer may be released from the chute and releasably attached to a portion of the truck or the frame. It is also contemplated that the strainer may be fixably attached to the truck and the chute movable between a discharge position for passing the cement from the vehicle to a cleaning position wherein the chute discharges through the strainer.

It is contemplated, the arm 26 can take a variety of configurations in addition to the telescopic configuration. The arm 26 can be of a telescoping, folding, articulated or swing (pivot) configuration.

In the telescoping configuration, the arm 26 can include a plurality of elements slideably connected between a retracted position and an extended position. Typically, in the retracted position, the arm 26 locates the strainer in a transporting position. In the extended position, the arm 26 locates the strainer relative to the chute so as to intersect a discharge or effluent stream from the chute.

In the folding or articulated configuration, the arm 26 includes at least one joint about which adjacent sections of the arm can rotate or pivot. It is contemplated the arm 26 can include a plurality of segments or sections, wherein adjacent sections can rotate about vertical or horizontal axes. It is understood the axis can be inclined relative to a horizontal and vertical plane. The arm 26 can include two, three or more sections, depending upon the size of the truck 8, the strainer 24 and the retracted and extended positions.

In the swing arm configuration, the arm 26 is a generally fixed length and rotates relative to the truck 8 between the retracted and the extended position. Movement of the arm 26 between the retracted and extended positions can be manual or assisted, such as by hydraulic, pneumatic, spring or counterweight. Typically, the swing arm is pivotally connected to the truck 8 at a pivot point located higher than the discharge end of the chute, such that the arm can swing to the extended position to operably locate the strainer relative to the chute.

The telescoping, folding, articulated or swing (pivot) configurations of the arm 26 can be actuated by any of a variety of mechanisms, including but not limited to hydraulic, pneumatic, motorized, electric, magnetic, winch, spring or counterweight. For example, a hydraulic system can be disposed within or in conjunction with a telescopic arm so as to provide a motive force for moving the arm between the extended position and the retracted position. Similarly, a single hydraulic or pneumatic piston or actuator can be used to provide the extendable arm function and movement of the attached strainer between a retracted position and an extended position. It is also contemplated that electric rollers, motors or winches can be used to move the arm from the retracted to the extended position. Alternatively, a cable system could be used in connection with pulleys and/or a counterweight to allow movement of the arm 26 and strainer 24 from a retracted position to the extended (or operable) position.

It is further contemplated the strainer 24 can be moved between the retracted position and the operable position, without requiring connection to the arm 26. That is, the strainer 24 can be connected to a cable-counterweight system to allow an operator to translate the strainer between the retracted and the operable positions, such that in the operable position, the strainer can be located relative to the end of the chute, or releasably engaged with the chute. That is, the system can be employed to assist the operator in effectively moving the strainer from the retracted position, such that the operator then engages the strainer with the chute, alternatively, the system can locate and retain the strainer relative to the chute to intersect the discharge stream from the chute. In conjunction with the swing arm configuration, the truck 8 can include any of the previously described mechanisms for actuation of the arm 26.

It is also contemplated the truck 8 can include a claw or crane type arm to move the strainer 24 between the retracted and the extended positions.

Referring to FIG. 8, the strainer 24 can be releasably engaged with the chute to locate the strainer relative to the end of the chute, and particularly with a discharge stream from the chute. The strainer can releasably engage the chute by any of a variety of mechanisms including, but not limited to, hooks, pins, cams, bayonettes, slide engagement including tapered slides as well as a twist including a partial rotation of the strainer relative to the chute.

In a further configuration, it is contemplated that a site specific strainer 24 can be located at a work site, such that the strainer 24 can be transported from one truck 8 to a second truck. In such configuration, the strainer can be connected to a dolly, such as a wheeled dolly, to move the strainer relative to the trucks 8 at a given site.

It is also understood the strainer 24 can be manually moved from the retracted position to the extended position and mechanically assisted in moving from the extended position to the retracted position. Specifically, upon intersecting the strainer 24 with the discharge from the chute, the residual materials of the cement are entrained by the strainer. Thus, upon cleaning the chute, the strainer has a substantially increased weight and thus may become too heavy for an operator to manually move. Therefore, the moveable arm can be used to engage the loaded strainer as well as, or alternatively the dolly can be employed.

It is also understood the strainer 24 can be employed in a fluid recycling configuration, where particulates are retained in the strainer and the fluid is recycled to the truck, or an open configuration where the particulates are retained in the strainer and the fluid is allowed to pass from the system.

Thus, the present invention provides the arm 26 connected to the truck 8, wherein the arm is moveable between a retracted (transport or stowed) position and an operable position. It is further contemplated the strainer 24 can be retained relative to the end of the chute or releasably engage the end of the chute to intersect the discharge stream from the chute.

While I have described the invention in connection with preferred embodiments, I am aware that numerous and extensive departures may be made therein without however departing from the spirit of my invention and the scope of the appended claims.

What is claimed:

1. An improved device for recycling residues from a material delivery chute of a cement mixer truck having a mixing drum, the material delivery chute being pivotally mounted to the cement mixer truck and having an upper end proximal to the mixing drum and a lower end distal to the mixing drum, the improvement comprising:

(a) a moveable arm connected to the cement mixer truck, the arm moveable between a retracted position and an operable position; and (b) a strainer having an inlet and an outlet, the strainer connected to the arm to be moveable from a transport position to an operating position operably aligned with the material delivery chute to receive effluent slurry from the material delivery chute.

2. The device of claim 1, wherein the moveable arm is extendable.

3. The device of claim 1, wherein the moveable arm pivots between the retracted position and the operable position.

4. The device of claim 1, further comprising a hydraulic actuator connected to the moveable arm to dispose the moveable arm between the retracted position and the operable position.

5. The device of claim 1, further comprising an electric actuator for disposing the moveable arm between the operable position and the retracted position.

6. The device of claim 1, wherein the moveable arm is articulated.

7. The device of claim 1, further comprising one of a hydraulic, pneumatic or electric actuator connected to the arm to dispose the arm between the retracted position and the operable position.

8. The device of claim 1, wherein the arm is a swing arm pivotally connected to the truck.

9. An improved screening apparatus for a truck having a cement retaining chamber and an outlet chute for passing an effluent slurry, the outlet chute pivotally attached to the truck and having an upper end proximal to the cement retaining chamber and a lower end distal to the cement retaining chamber, the improvement comprising:

(a) a strainer having openings sized to pass fluid from the effluent slurry while retaining particulate matter; and (b) means on at least one of the outlet chute and the strainer for releasably engaging the strainer with the outlet chute.

10. The screening apparatus of claim 9, further comprising an arm connected to the truck, the arm moveable between a retracted position and an extended position, the strainer connected to the chute and located to intersect the effluent slurry.

11. A device for recycling residues from a material delivery chute of a cement mixer truck, comprising:

(a) a moveable arm connected to the cement mixer truck, the arm moveable between a retracted position and an operable position;

(b) a strainer having an inlet and an outlet, the strainer connected to the arm to be moveable from a transport position to an operating position operably aligned with the material delivery chute to receive effluent slurry from the material delivery chute; and (c) a hose extending between the strainer outlet and the cement mixer truck.

12. A cement mixer truck, comprising:

(a) a mixing drum for retaining a quantity of cement, the mixing drum having an open end;

(b) a cement pouring chute pivotally mounted relative to the mixing drum, the cement pouring chute having an upper end adjacent the open end of the mixing drum and a lower end spaced from the mixing drum;

(c) a moveable arm connected to the cement mixer truck, the arm moveable between a retracted position and an operable position; and (d) a strainer having an inlet and an outlet, the strainer connected to the moveable arm to be moveable to an operative position operably aligned with the lower end of the cement pouring chute.

\* \* \* \* \*